June 2, 1953  I. A. COOK  2,640,293
MOUSE AND RAT TRAP
Filed March 7, 1949
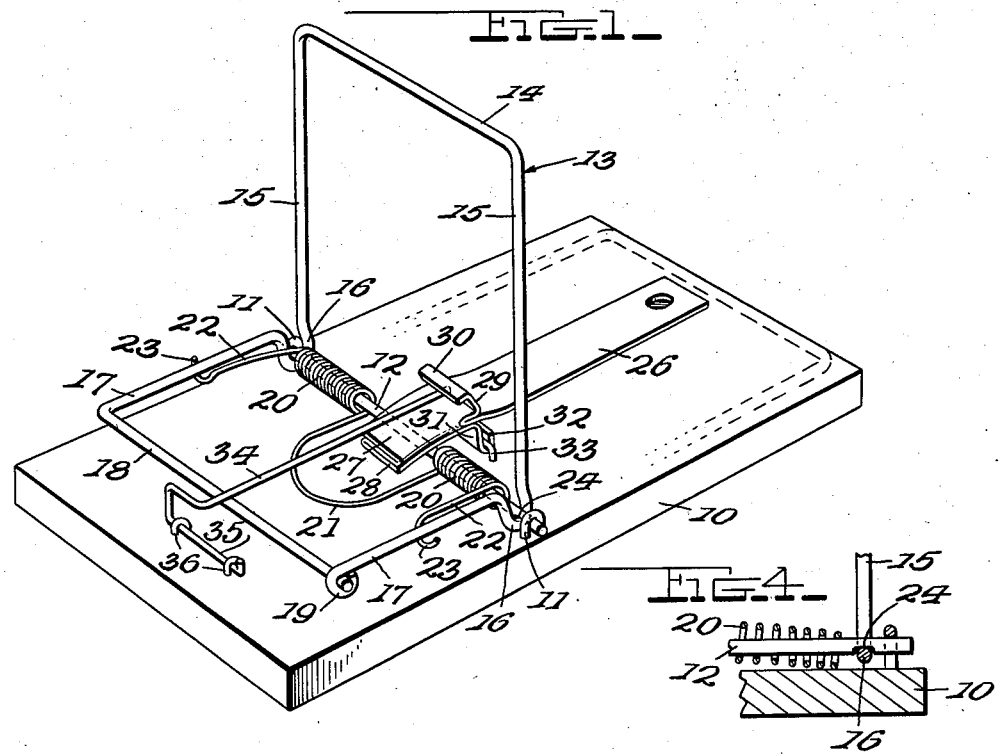
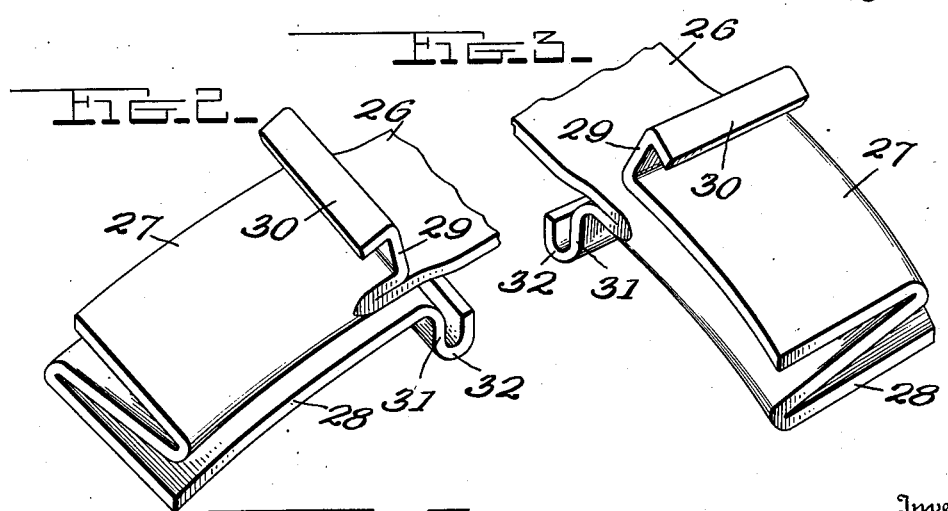
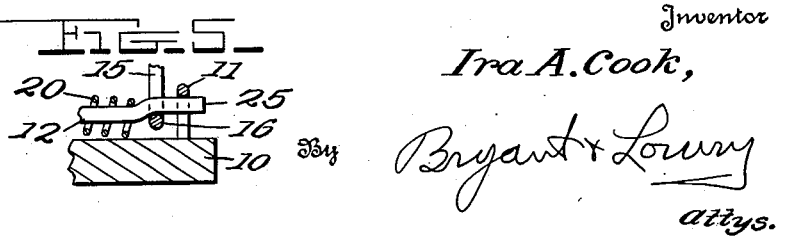
Inventor
Ira A. Cook,
By Bryant & Lowry
attys.

Patented June 2, 1953

2,640,293

UNITED STATES PATENT OFFICE 2,640,293

MOUSE AND RAT TRAP

Ira A. Cook, Westminster, Calif.

Application March 7, 1949, Serial No. 79,926

1 Claim. (Cl. 43—81)

This invention relates to traps for catching mice, rats and other small animals, and has special reference to a device for such purposes in which the capture and possible death of an animal is effected by means of a bar spring pressed against a flat base.

The usual device of this general type requires the use of two hands to effect setting of the trap, one of the hands being in such position as to be liable to accidental injury by being caught between the bar and base above mentioned.

One important object of the present invention is to provide a novel construction of a trap of this kind wherein the setting of the trap is effected by one hand only.

Another important object of the invention is to provide a novel construction of a trap wherein the single hand used for setting the trap is at no time in position to be gripped between the bar and base.

Many people dislike handling dead animals and, in some instances, dangerous infections may occur when such animals are handled.

A further object of the invention is to provide a novel trap of the kind from which an animal caught therein may be released from the trap without the person using the trap contacting the animal.

Such traps are provided with a bait carrying trigger which serves to hold the trap in set condition until the trigger is tripped by an animal seeking to remove the bait.

A still further object of the invention is to provide a novel trigger for such traps which is of simple construction, being made from a sheet metal stamping folded and bent to produce all the necessary elements of the trigger.

With the above and other objects in view, the invention consists in general of certain novel details of construction and combinations of parts hereinafter fully described, illustrated in the accompanying drawings and particularly claimed.

In the drawings like characters of reference indicate like parts in the several views, and Figure 1 is a perspective view of a trap constructed in accordance with this invention;

Figure 2 is an enlarged detail perspective view of the principal end of the trigger used herein;

Figure 3 is a view similar to Figure 2 but taken from the opposite side of the trigger;

Figure 4 is a detail, partly sectional, and showing the preferred arrangement for holding the shaft pin of this invention in place; and Figure 5 is a view similar to Figure 4 but illustrating a modification of the shaft pin.

In the construction of the device as shown in the drawings, there is provided a flat rectangular base 10. This may be made of any desired material, and wood is well adapted for use in this particular, both for economy and because certain parts of the device may be attached to the base by simple driving operations.

The base is preferably somewhat longer than wide, and there is provided adjacent each side edge about midway of its length an eye 11 which may be formed by an ordinary wire staple driven into the base. A shaft pin 12 extends through the eyes 11 and forms the axis of rotation for the animal catching bar 13. This bar 13 includes a cross-piece 14 from the ends of which extends a pair of parallel sides 15. The sides 15 extend towards the shaft pin 12 and at the free end of each side the wire from which these parts are made is bent to provide a loop 16 extending around the pin 12 and forming a fulcrum for the catcher bar 13. From the loops 16 extends a pair of parallel side portions 17 which carry a finger bar 18. At the end of one of the sides 17 there is formed a loop 19 which engages around the extremity of the bar 18. The structure just described provides a bell crank device formed of a single length of wire and having a pair of sides each constituting a bell crank lever pivoted to the shaft pin, said sides being connected at respective ends by a finger bar and a catcher bar.

The bar 14 is urged forwardly and downwardly towards the base 10 by spring means. The spring means here used includes a pair of coiled torsion springs 20 surrounding the pin 12 adjacent the loops 16. The proximal ends of these springs are connected by a U-shaped loop 21. The wire at the outer end of each spring extends tangentially to form an arm 22 and the free end of each arm 22 is bent to provide a loop 23 which extends around a respective side 17 forming one arm of one of the pair of bell crank levers above referred to. The springs 20 are under such torsional stresses that they tend to constantly unwind and thereby to rock the bar 14 forwardly and down and to rock the finger bar 18 upwardly and forwardly. In order to prevent the shaft pin 12 from slipping longitudinally and disengaging from the eyes 11 the ends of this pin may be notched or offset as at 24 in Figure 4 or have offset bent ends as at 25 in Figure 5 to receive loops 16 to hold the angular rectangular wire frame composing the catching bar 13 and a finger bar to be later described, and also pin 12 in position.

The trigger and bait holder here shown consist of a T-shaped stamping or strip of sheet metal having a stem or shank 26 extending over the pivot pin 12 at its rear end at or into the loop 21 and provided to hold the bait near its forward end, and a pair of arms 27 and 28 projecting from the head of the stem forming a Z-shaped cross-section. One of these arms, as 27, is doubled or bent over in one direction from and to lie on top of the stem 26, and at the edge facing towards the opposite end of the stem this arm is provided with an upstanding flange 29 extending transversely of the trigger and provided with a flat lip 30 extending toward the head end of the stem 26. The other arm 28 is bent in the opposite direction to arm 27 from the stem 26 and provided below the flange 29 with a flange 31 having its free edge bent to form a loop 32 wherein engages the transverse portion of a staple 33 driven into the base 10 and forming a fulcrum for the trigger. The stamping or strip is thus bent in substantially cross-shape viewed edgewise and extending rearwardly over the slightly elevated pin 12 to limit the downward movement of the rear end of the trigger and bait holder and the upward movement of the free forward bait holding end in set position.

At 34 is a keeper finger formed of wire and the wire is bent laterally at right angles at two points in parallelism in opposite directions with an intermediate vertical connecting portion, and extended at the bottom to form a downwardly offset transverse pivot head 35 revolubly secured to the base 10 by staples 36. This finger overlies the finger bar 18 and engages under the lip 30 when the trap is set as in Figure 1.

The trigger, although having its pivot in the rear zone of its length, is of substantially balanced type—the weight forward of the pivot substantially equals the weight rearward of the pivot, thus providing a balanced condition—due to the three ply formation of the rear zone. This is of especial advantage in that it permits setting of the trap under non-dangerous conditions through the fact that the trigger does not automatically change position at any time, remaining in a definite position until a changed position is essential, a condition essential during such setting operation; in addition, it provides for sensitivity of the trigger since weight is absent as a resistance factor to trigger movement.

In the operation of the trap from the set position of Figure 1, the action of an animal trying to remove bait from the free end of the trigger tilts this free end down until the lip 30 disengages from the keeper finger 34 which is then free to fly upward and release the bell crank device before described to spring downward with considerable force toward the base 10 to pin the animal therebetween. Assuming an animal to have been caught and that it is desired to dislodge it from the trap it is merely necessary to lift the trap by grasping the end remote from the animal and pressing with a finger of the lifting hand on the finger bar 18 to move it rearward. This will lift the bar 18 from the animal and it will drop free.

To reset the trap the keeper is swung to vertical position, the base being grasped in one hand, the finger bar 18 is tilted rearwardly and downwardly after which the front of the base is tilted down until the keeper finger drops over the finger bar whereupon it is moved to engage beneath the lip 29 and the device is then in set position.

To reset the trap under non-dangerous conditions, the following regimen is employed:

With finger 34 rearward, the striker 13 is raised to its set zone by drawing its rear loop downward into contact with the base and held there by the user's finger pressure on bar 18 while grasping the rear end of the trap. The trap is now swung in a limited arcuate path downward with sudden stoppage. Since the trigger is pivoted, the stoppage does not affect its movement and its front end continues movement into contact with the base, thus rocking the keeper into an open position. If the arcuate swing has not carried finger 34 forward, it may be moved forward manually or fall to its position by the inclination of the trap, the end of the finger resting on the upper face of 27. The trap is now swung upwardly in an arcuate path with sudden stoppage, an action which again permits the trigger to continue its swing until the under ply 28 contacts the base, thus rocking the trigger on its pivot in a direction to throw the lip of the keeper 30 over the positioned end of finger 34 with the finger itself overlying 18. The rear loop is now eased upwardly until bar 18 engages the finger 34 and raises the front end of the latter into contact with the under face of the keeper lip, thus setting the trap.

During the regimen the balanced condition of the trigger has been of importance in retaining the keeper in open position while finger 34 is being positioned, and again, in holding the keeper in closed position during the easing of the rear loop into the set condition of the trap, the keeper remaining in its particular position until shifted by the arcuate swing, thus placing the timing of the keeper movements wholly within the control of the user during such setting operation.

During the regimen the hand of the operator has remained constantly in the rear zone of the trap and completely away from any point of danger, and since it has not passed forward of rod 12, it has not contacted any surface with which the rodent has contacted; hence, the trap can be used even by those to whom such contact would be unpleasant.

What is claimed is:

In a mouse and rat trap, an elongated flat base, a pair of eyes secured adjacent the side edges of the base opposite each other, a pivot rod extending through said eyes and having upwardly offset ends engaging in the eyes, a striker consisting of a single length of wire having a first centrally disposed transverse portion, said wire being bent at the ends of the transverse portion to provide a first pair of parallel side arms having rearwardly upturned U-shaped open loops at their extremities and engaging around the offset ends of said rod; said striker having a second pair of parallel side arms extending from said loops in a plane at right angles to the plane of the first pair of side arms, said striker having a second transverse portion extending from the end of one of the second pair of side arms and engaging in an eye formed in the other of said second pair of side arms; a keeper finger secured to the base at its rear to extend across the said second transverse portion of the striker for holding the striker in set position; a bait substantially balanced carrying trigger adapted to releasably engage the end of the keeper finger upon setting of the keeper finger, and spring means for urging said striker from set to closed position.

IRA A. COOK.

References Cited in the file of this patent

UNITED STATES PATENTS

| Number | Name | Date |
|---|---|---|
| 481,707 | Trumble | Aug. 30, 1892 |
| 630,346 | Hall | Aug. 8, 1899 |
| 1,194,954 | Casey | Aug. 15, 1916 |
| 1,333,875 | Pokorny | Mar. 16, 1920 |
| 1,410,737 | Dickey | Mar. 28, 1922 |
| 1,455,106 | Butler | May 15, 1923 |
| 1,488,475 | Crawford | Apr. 1, 1924 |
| 1,501,384 | Wills | July 15, 1924 |
| 1,675,532 | Cassna | July 3, 1928 |
| 2,348,981 | Johnson | May 16, 1944 |
| 2,368,581 | Stilson | Jan. 30, 1945 |
| 2,502,850 | Johnson | Apr. 4, 1950 |

FOREIGN PATENTS

| Number | Country | Date |
|---|---|---|
| 66,326 | Norway | June 15, 1943 |